United States Patent
Motomura

(10) Patent No.: US 7,238,934 B2
(45) Date of Patent: Jul. 3, 2007

(54) MICROSCOPE APPARATUS AND METHOD FOR CONTROLLING MICROSCOPE APPARATUS

(75) Inventor: Shinji Motomura, Plainview, NY (US)

(73) Assignee: Olympus Corporation, Tokyo (JP)

( * ) Notice: Subject to any disclaimer, the term of this patent is extended or adjusted under 35 U.S.C. 154(b) by 206 days.

(21) Appl. No.: 11/024,380

(22) Filed: Dec. 28, 2004

(65) Prior Publication Data

US 2005/0156106 A1    Jul. 21, 2005

(30) Foreign Application Priority Data

Jan. 15, 2004   (JP) .............................. 2004-007521

(51) Int. Cl.
   *H01J 5/16*    (2006.01)
(52) U.S. Cl. ........................ 250/234; 359/368
(58) Field of Classification Search ................ 250/234, 250/235, 208.1; 359/368, 385, 390, 391, 359/393
   See application file for complete search history.

(56) References Cited

U.S. PATENT DOCUMENTS

2004/0114218 A1* 6/2004 Karlsson et al. ............ 359/368

FOREIGN PATENT DOCUMENTS

JP          6-27383 A        2/1994

* cited by examiner

*Primary Examiner*—John R. Lee
(74) *Attorney, Agent, or Firm*—Frishauf, Holtz, Goodman & Chick, P.C.

(57) ABSTRACT

A distance is calculated between a target observation area which is an observation area in which a focusing position of an object lens provided for the microscope apparatus is positioned in a plurality of observation areas set for an observation specimen which is an observation target in the microscope apparatus; moving the observation specimen on a plane perpendicular to an optical axis of the object lens; and an observation area on which no image obtaining process or stimulating process are performed among the observation areas, and which has the shortest distance to the target observation area is positioned in the focusing position of the object lens.

14 Claims, 15 Drawing Sheets

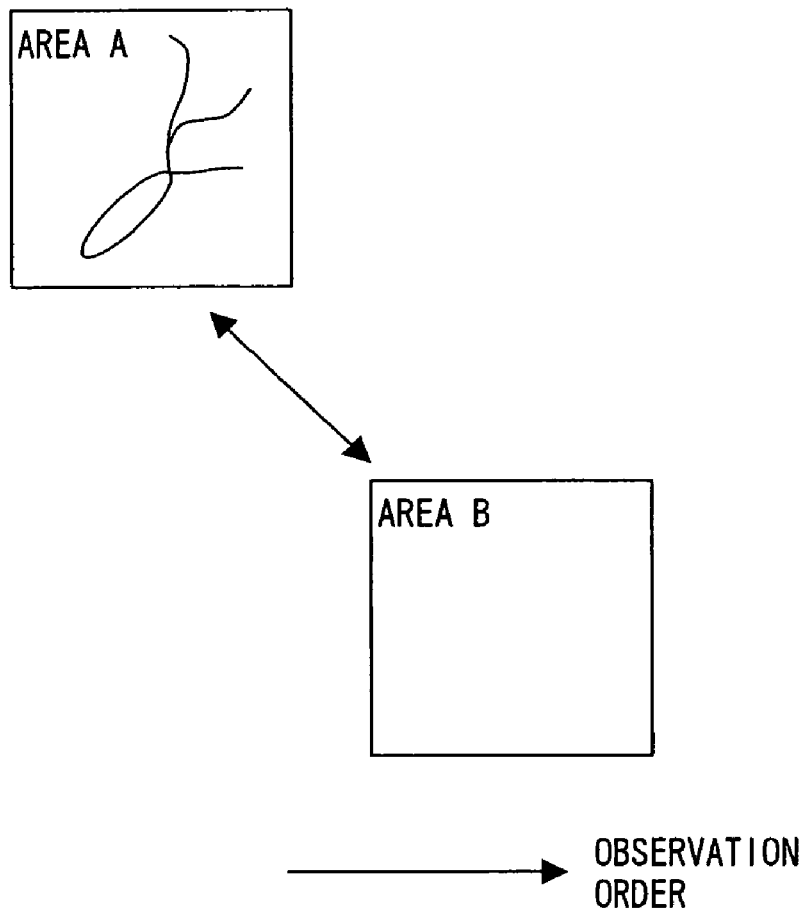
F I G. 9 A

US 7,238,934 B2

MICROSCOPE APPARATUS AND METHOD FOR CONTROLLING MICROSCOPE APPARATUS

CROSS REFERENCE TO RELATED APPLICATIONS

This application claims benefit of Japanese Application No. 2004-7521, filed Jan. 15, 2004 the contents of which are incorporated by this reference.

BACKGROUND OF THE INVENTION

1. Field of the Invention

The present invention relates to the technology for use with a microscope apparatus, and more specifically to a technology for observing a time series change of an observation specimen.

2. Description of the Related Art

A confocal point laser scanning microscope apparatus is widely known as a microscope apparatus. The confocal point laser scanning microscope apparatus focuses a laser beam to a small spot beam, converts the light from an observation specimen to an electric signal when the observation specimen is scanned by the spot beam, generates an image of the observation specimen based on the electric signal, and displays the image on an image monitor.

Conventionally, such a microscope apparatus has been widely used as means for observing a three-dimensional structure and style of a cell and tissue. However, these days, it is used as means for analyzing the dynamics of a live cell structure.

For example, Japanese Patent Laid-open Publication No. Hei 6-27383 discloses the technology of obtaining a plurality of tomographic images of a specimen in the optical axis direction at predetermined time intervals, generating a difference image of a tomographic image of a specimen with a lapse of time, generating a pseudo three-dimensional image of a specimen from the difference image, and displaying the generated image with a lapse of time, thereby observing a three-dimensional change of a specimen with time.

One of the methods of observing a dynamic change of a cell in a time series can be a multipoint time lapse observation. A multipoint time lapse observation refers to an observation of a time series change in each of a plurality of observation areas set on an observation specimen.

For example, when a multipoint time lapse observation is made using a confocal point laser scanning microscope apparatus, an operator registers a plurality of target areas in an observation specimen in the confocal point laser scanning microscope apparatuss, which is obtained by combining an electric XY stage device with a motorized focusing unit, and the confocal point laser scanning microscope apparatus repeats, as an experiment, obtaining an image of each target area at predetermined time intervals or a predetermined number of times.

When the experiment is started, the confocal point laser scanning microscope apparatus repeats obtaining an image of each target area by operating the electric XY stage device and the motorized focusing unit. The operation of repeating an image is performed by an operator in the order the target areas are registered.

Registering target areas is performed by an operator searching for target areas from among cells distributed in a specimen, but the operator does not consider the travel of the electric XY stage device and the motorized focusing unit. Therefore, there are a number of wasteful operations of the electric XY stage device and the motorized focusing unit, and the wasteful operations bring about the problem of a prolonged time required for the experiment.

In the time series observation of a live cell, it is possible that a shape change and travel of a cell reaches an unexpected range. Therefore, the cell can deviate from a predetermined observation view. When a cell deviates from an observation view during the experiment of a multipoint time lapse observation, for example, the experiment continues by an operator registering a new target area in a confocal point laser scanning microscope apparatus, thereby enabling subsequent observation. However, obtaining an image of a target area added and registered during the experiment is performed last in repeatedly obtaining a series of images. Therefore, as in the above-mentioned case, there are a number of cases in which the electric XY stage device and the motorized focusing unit perform wasteful travel.

SUMMARY OF THE INVENTION

A microscope apparatus which is one of the aspects of the present invention includes: a plane traveling unit for moving an observation specimen on a plane perpendicular to the optical axis of an object lens; an observation area position setting-obtaining unit for obtaining the setting of a position on the plane of each of a plurality of observation areas performed on the observation specimen; a target observation area process unit for obtaining an image of a target observation area which is an observation area in which the focusing position of the object lens is located, or stimulating the target observation area; a calculation unit for calculating the distance between the target observation area and other observation areas; and a plane travel control unit for controlling the plane traveling unit and moving the observation specimen, and positioning an observation area on which no image obtaining process or stimulating process are performed among the observation areas, and which has the shortest distance to the target observation area in the focusing position of the object lens.

A microscope apparatus which is one of other aspects of the present invention includes: a plane traveling unit for moving an observation specimen on a plane perpendicular to the optical axis of an object lens; an observation area position setting-obtaining unit for obtaining the setting of a position on the plane of each of a plurality of observation areas performed on the observation specimen; a target observation area process unit for obtaining an image of a target observation area which is an observation area in which the focusing position of the object lens is located, or stimulating the target observation area; a calculation unit for calculating the distance between the target observation area and other observation areas; and a plane travel control unit for controlling the plane traveling unit when the observation specimen is moved by sequentially positioning all observation areas in the focusing position of the object lens such that the observation specimen can be moved in an order based on the distance and in the order the travel path length can be can be shortest possible.

A method for controlling a microscope apparatus which is one of a further aspects of the present invention includes: calculating a distance between a target observation area which is an observation area in which a focusing position of an object lens provided for the microscope apparatus is positioned in a plurality of observation areas set for an observation specimen which is an observation target in the microscope apparatus; moving the observation specimen on a plane perpendicular to an optical axis of the object lens;

and positioning an observation area on which no image obtaining process or stimulating process are performed among the observation areas, and which has the shortest distance to the target observation area in the focusing position of the object lens.

BRIEF DESCRIPTION OF THE DRAWINGS

The present invention will be more apparent from the following detailed description when the accompanying drawings are referenced.

FIG. 9A shows an example of determining the order of observing observation areas when an experiment is started;

DESCRIPTION OF THE PREFERRED EMBODIMENTS

The embodiments of the present invention are explained below by referring to the attached drawings.

Figure 1:
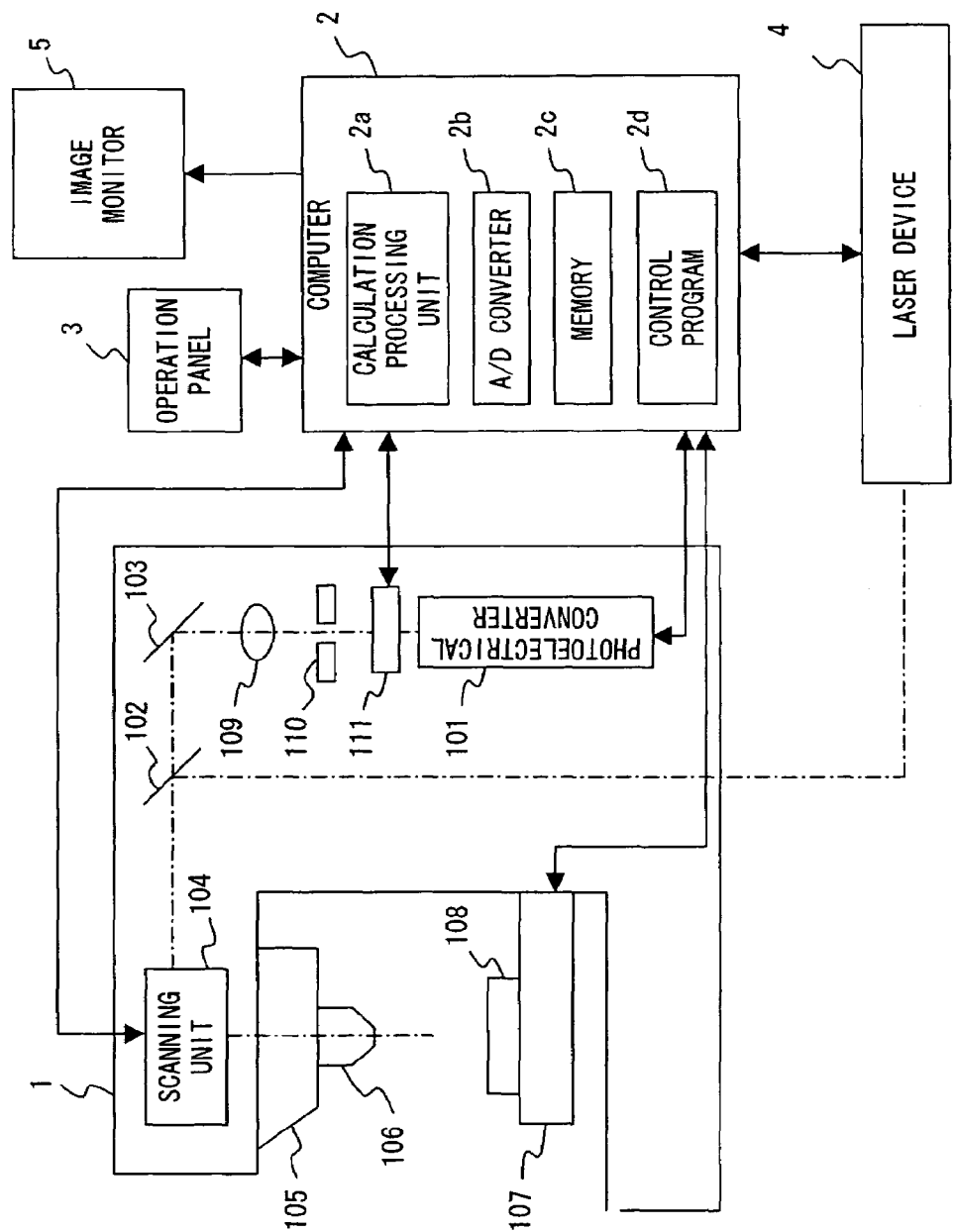
FIG. 1 shows the configuration of the confocal point laser scanning microscope apparatus for embodying the present invention.

FIG. 1 shows the configuration of the confocal point laser scanning microscope system embodying the present invention.

In FIG. 1, a computer 2 is connected to a body of a confocal point laser scanning microscope 1. The computer 2 is also connected to a laser device 4 which is the source of a laser beam and an image monitor 5 for display of an image.

The laser beam input from the laser device 4 to the body of the confocal point laser scanning microscope 1 is reflected by an exciting dichroic mirror 102, and input to a scanning unit 104. The scanning unit 104 has a galvanometer for scanning in the X axis direction and a galvanometer for scanning in the Y axis direction, and scans n the X axis direction (main scanning direction) and the Y axis direction (subscanning direction) with a laser beam orthogonal to each other on a plane perpendicular to the optical path of the laser beam to an object lens 106 attached to a revolver 105 according to a scanning control signal transmitted from the computer 2. Each time the scanning of one line in the X axis direction in the two-dimensional scanning is completed, the scanning unit 104 outputs a scanning control termination signal to the computer 2.

The laser beam for XY scanning illuminates as a spot beam an observation specimen 108 set on a stage 107. By the illumination of the spot beam, the light from the observation specimen 108 to the object lens 106 (for example, reflected light, or fluorescent light generated by the observation specimen 108) is returned to the incident optical path in the body of the confocal point laser canning microscope 1, reflected by a dichroic mirror 103 through the exciting dichroic mirror 102, and gathered by a lens 109. A confocal aperture 110 is arranged at the light gathering position of the lens 109, thereby configuring a confocal optical system.

The light passing through the confocal aperture 110 is input to a barrier filter 111. The barrier filter 111 passes only the wavelength owned by an observer in the input light, and inputs the light to a photoelectrical converter 101 such as a photomultiplier, etc. The photoelectrical converter 101 converts the input light to an analog electric signal. By an A/D converter 2b analog-to-digital converting the electric signal, digital data is obtained depending on the quantity of light input to the photoelectrical converter 101.

The digital data is stored in memory 2c. Based on the data accumulated in the memory 2c by one cycle of XY scanning by the scanning unit 104, an image on the observation specimen 108 is generated, and displayed on the image monitor 5.

The stage 107 is an electric XY stage device movable in the X axis direction and the Y axis direction orthogonal to each other on the plane (referred to as an XY plane) perpendicular to the optical axis of the object lens 106 attached to the revolver 105. When the scanning unit 104 scans in the X axis direction with a laser beam, a spot beam scanning is performed in the X axis direction on the stage 107. When the scanning unit 104 scans in the Y axis direction with a laser beam, a spot beam scanning is performed in the Y axis direction on the stage 107. Inside or outside the body of the confocal point laser scanning microscope 1, a Z motor (not shown in FIG. 1) is provided as a motorized focusing unit. By operating the motorized focusing unit, the image monitor 5 or the stage 107 can be moved in the Z axis direction which is the optical axis direction of the object lens 106.

The travel in each of the X, Y, and Z axis directions of the electric XY stage device and the motorized focusing unit is controlled by the computer 2.

An operation panel 3 connected to the computer 2 has a pointing device such as a track ball, a joy stick, a mouse, etc. in addition to a keyboard, and when an observer operates the device, a scanning start instruction, an image obtain instruction, an adjust instruction of the photoelectrical converter 101, etc. are executed through the computer 2.

The computer 2 allows a calculation processing unit 2a having a CPU (central processing unit) to execute a control program 2d, thereby controlling the entire system shown in FIG. 1. Especially, when a scanning start instruction is input from the operation panel 3, the computer 2 outputs a scanning control signal to the laser device 4, converts an analog signal output from the photoelectrical converter 101 to digital data, transfers the data to the memory 2c, and displays the image of the observation specimen 108 on an image monitor 5 with the menu screen for a scan instruction. When a sensitivity adjust instruction is input from the 3, the computer 2 sets a voltage to be applied, an amplification gain, offset, etc. for the photoelectrical converter 101 on the body of the confocal point laser scanning microscope 1. Otherwise, the operation control by the scanning unit 104, the emission of a laser beam from the laser device 4, the display control on the image monitor 5 of an image based on the data stored in the memory 2c, etc. are performed by the computer 2 in response to the input of a predetermined instruction from the operation panel 3.

The calculation processing unit 2a stores the information about an observation area desired by an observer, for example, the information about the coordinates (for example, the coordinates of the central position of the observation area) specifying the position of the area in the memory 2c using the coordinates of the X, Y, and Z based on the optical axis of the object lens 106, and further stores the image scanning condition in the observation area in the memory 2c. The image scanning condition refers to a necessary condition for obtaining an image desired by an observer such as a voltage to be applied, an amplification gain, offset, etc. for the photoelectrical converter 101, or the number of slices in the Z axis direction (number of images about the observation area obtained with the z coordinate changed at predetermined time intervals), the step size among the slices (change width of the z coordinate when an image is obtained for an observation area with the z coordinate changed at predetermined time intervals), etc.

The calculation processing unit 2a determines the passing order of registration position for efficient travel path from the observation area at the focusing position of the object lens 106 to the position of the original observation area through all observation areas in the current status of the body of the confocal point laser scanning microscope 1 according to the position information about the current area stored in the memory 2c by executing the control program 2d stored in the storage device provided in the computer 2.

The calculation processing unit 2a controls the operation of the electric XY stage device and the motorized focusing unit so that the observation specimen 108 can be moved along the travel path according to the determined passing order by executing the control program 2d.

Described below is the method of determining the passing order of an observation area performed by the calculation processing unit 2a in the system shown in FIG. 1.

First, the observer observes an enlarged image of the observation specimen 108 through, for example, an object lens (not shown in FIG. 1) provided for the body of the confocal point laser scanning microscope 1. At this time, the electric XY stage device and the motorized focusing unit are operated to set a plurality of observation areas on the observation specimen 108, and each position of the observation area is registered in the computer 2.

Figure 2A:
FIG. 2A shows an example of the registration order of observation areas.
Figure 2A:
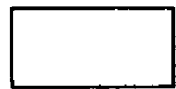
Figure 2A:
Figure 2A:
Figure 2A:

FIG. 2A shows an example of registration of an observation area. The number assigned in FIG. 2A indicates the registration order of an observation area, and observation areas are registered in the order of the assigned numbers No. 1, No. 2, No. 3, No. 4, and No. 5.

Figure 2B:
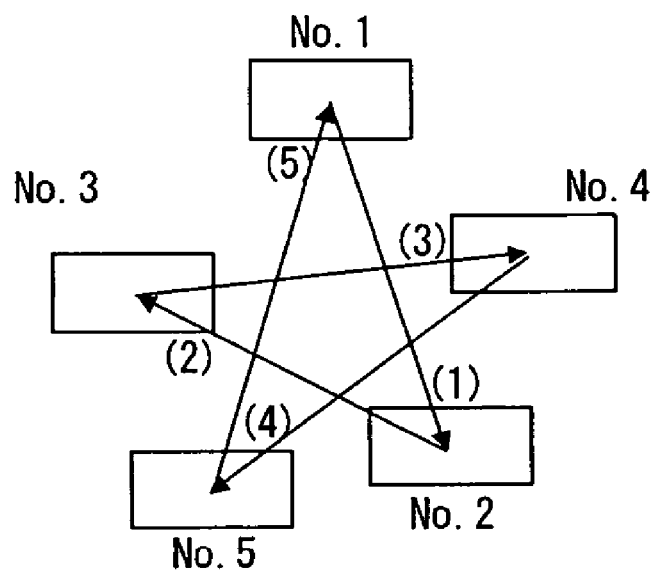
FIG. 2B shows the order of obtaining an image of an observation area in the conventional microscope apparatus.

When the observation areas are registered in the above-mentioned order, and when an image of an observation area is obtained in the registration order in the experiment for a multipoint time lapse observation, the images are obtained in the order of (1), (2), (3), (4), and (5) as shown by the arrow shown in FIG. 2B. If the experiment is performed with the conventional microscope, images are obtained in the above-mentioned order.

On the other hand, in the method according to the present embodiment, the observation order (obtaining order of images) of an observation area is determined by using the following method.

First, an observer selects the first to be observed (hereinafter referred to as a "leading observation area") in the registered observation areas, operates the operation panel 3, and sets the result in the computer 2. The selection of a leading observation area by an observer can be replaced with, for example, the calculation processing unit 2a automatically selecting as a leading observation area an observation area closest to the current focusing position of the object lens 106 on the XY plane (hereinafter referred to simply as an "observation position"), an observation area closest to a specific corner on the closed XY plane, etc.

In the example of the registration order shown in FIG. 2A, assume that the No. 1 observation area is set as a leading observation area.

Then, the calculation processing unit 2a calculates the distance between the leading observation area and another observation area on the XY plane and compares them, and selects an observation area whose distance from the leading observation area is the shortest.

Figure 3A:
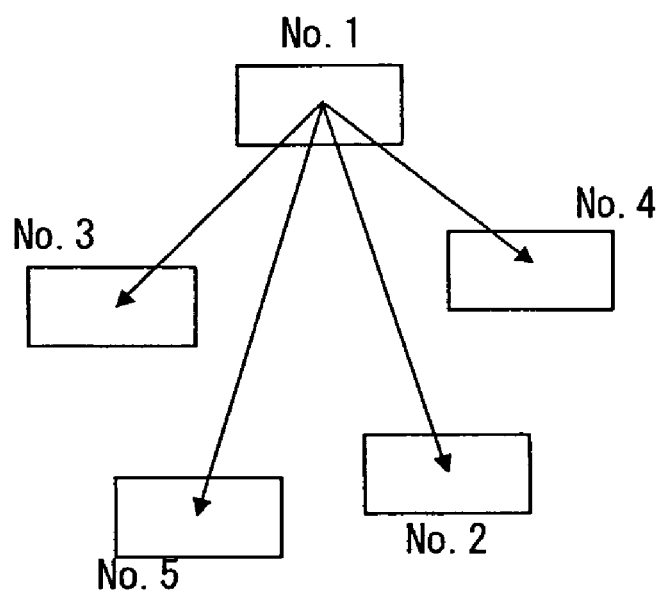
FIG. 3A is a view (1) for explanation of the first example of the procedure of selecting the travel path of the observation area.

In the example of the observation area shown in FIG. 2A, as shown in FIG. 3A, four distances between: No. 1 and No. 2, No. 1 and No. 3, No. 1 and No. 4, and No. 1 and No. 5 are calculated. In the calculated distances, the distance between No. 1 and No. 4 is the shortest. Therefore, after the No. 1 observation area, the No. 4 area is selected based on the distance.

When the compared distances are equal and shortest, for example, the earlier registered observation area is selected based on the above-mentioned registration order.

A word "target observation area" is defined below. A target observation area refers to an observation area to be observed in an observation order. In the example shown in FIG. 3A, the leading target observation area to be first positioned in the focusing position of the object lens 106 when the experiment is started is the No. 1 observation area, and the second target observation area is the No. 4 observation area.

Then, the calculation processing unit 2a selects the next target observation area after the target observation area selected as described above. At this time, as described above, the distance on the XY plane between the target observation area in the current observation order and the remaining observation area whose order has not been determined is calculated and compared, and an observation area having the shortest distance from the target observation area is selected as the next target observation area.

Figure 3B:
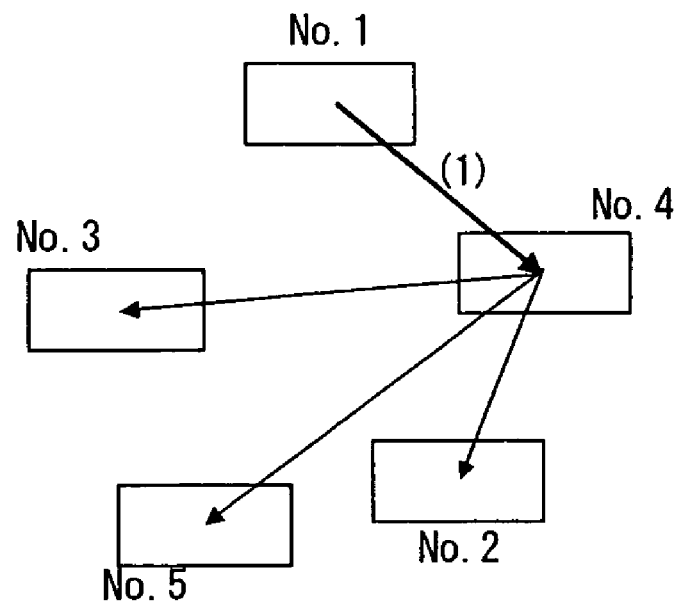
FIG. 3B is a view (2) for explanation of the first example of the procedure of selecting the travel path of an observation area.

In the example shown in FIG. 3A, when the observation area No. 4 is selected after the leading observation area No. 1, the distances between No. 4 and No. 2, No. 4 and No. 3, and No. 4 and No. 5 are calculated as shown in FIG. 3B. In the distances, the distance between No. 4 and No. 2 is the shortest. Therefore, the area No. 2 is selected as the next target observation area after the observation area No. 4.

The calculation processing unit 2a determines the observation order of all observation areas by repeating the selection of the above-mentioned observation areas.

Figure 4:
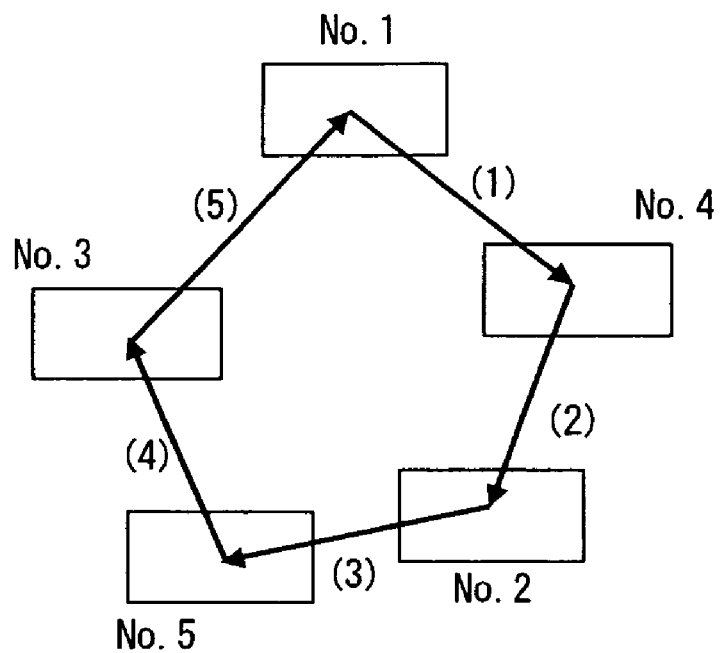
FIG. 4 shows the selection result of the travel path of an observation area.

FIG. 4 shows the observation order of the observation areas determined as described above for the example of the observation areas shown in FIG. 2A. Thus, from the example shown in FIG. 2A, the order of No. 1→No. 4→No. 2→No. 5→No. 3 is determined.

As described above, in the present embodiment, the observation area which has not been observed (whose image has not been obtained) in the observation areas and the distance between which and the target observation area is the shortest is sequentially selected from the leading observation area, and the observation order is determined. By repeating the observation at predetermined time intervals performed by sequentially positioning all observation areas in the observation position in the above-mentioned observation order, the multipoint time lapse observation can be performed.

As it is clear by comparison between FIGS. 2B and 4, the amount of travel of the observation specimen 108 to be moved to allow each observation area to be sequentially positioned in the observation position can be shortened by using the method according to the present invention. Therefore, as a result of removing wasteful operations of the electric XY stage device and motorized focusing unit, the required time is shortened. Since the operation time of the electric XY stage device motorized focusing unit can be shortened, the influence of the vibration generated on the observation specimen 108 when operating the electric XY stage device and motorized focusing unit can be reduced.

Described below is the processes shown in FIGS. 5 and 6. These figures are shown as flowcharts of the contents of the control processes performed by the calculation processing unit 2a of the computer 2. The processes shown in FIG. 2 are realized by executing the control program 2d by the calculation processing unit 2a.

Figure 5:
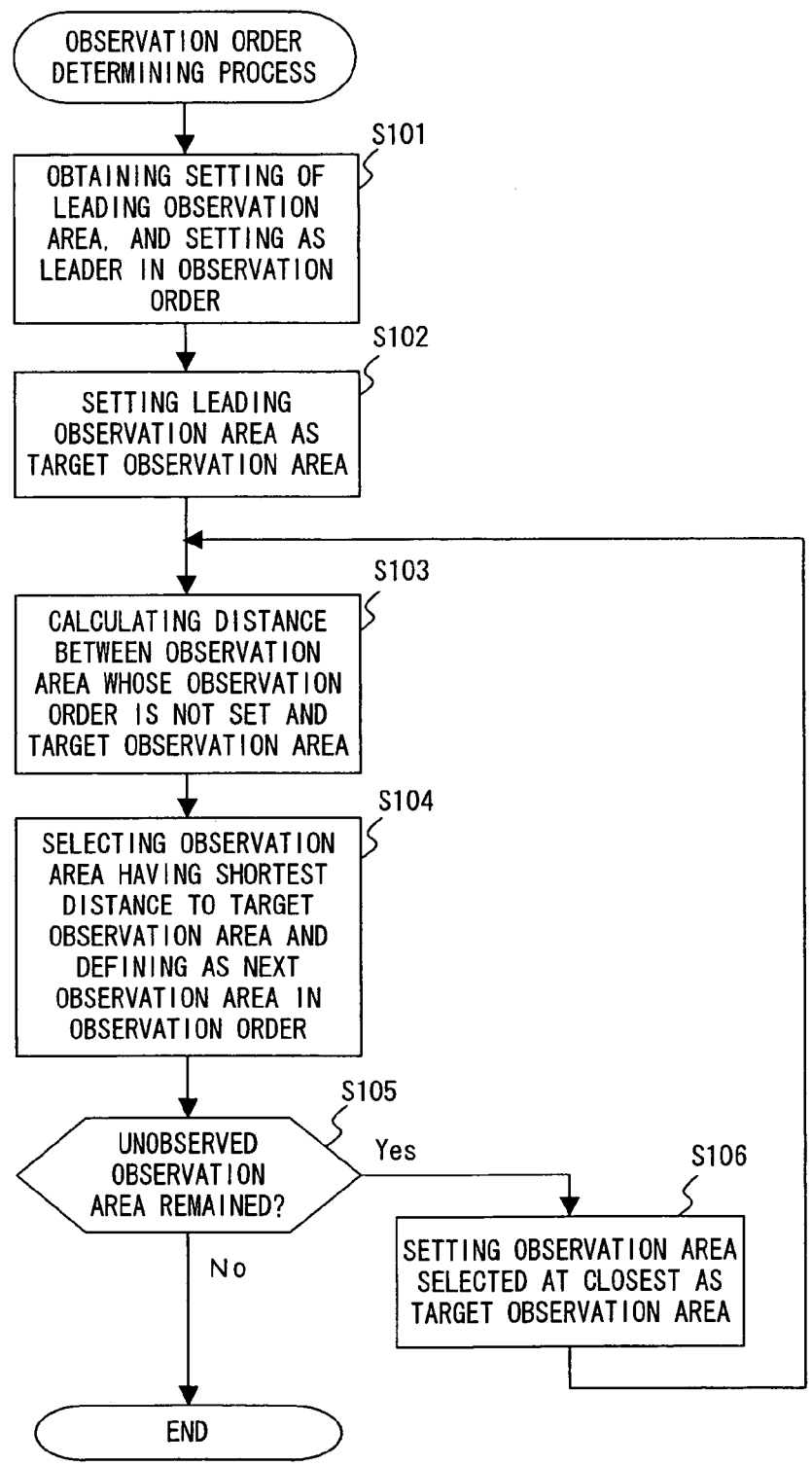
FIG. 5 is a flowchart showing the contents of the observation order determining process.

First, the flowchart shown in FIG. 5 is explained. FIG. 5 shows the contents of the observation order determining process. The process is to determine the observation order of each observation area according to the method of the present embodiment. The process is performed in the microscope control process described later.

In this example, it is assumed that each observation area and the information about it have already been stored in the memory 2c of the computer 2 before starting the execution of the process.

First, in S101, the leading observation area selected from each observation area and set is obtained by an observer or the calculation processing unit 2a itself, and the obtained leading observation area is set as the first in the observation order. Then, in S102, the leading observation area is set as the current target observation area.

In S103, the distance on the XY plane between the observation area which is stored in the memory 2c and whose observation order has not been set and the target observation area whose observation order is closely set is calculated. Then, in S104, an observation area having the shortest distance from the target observation area is selected, and the selected observation area is set as the next observation order.

In S105, it is determined whether or not there is still an observation area stored in the memory 2c whose observation order has not been set. If it is determined that there is still the observation area (the determination result is YES), then the observation area whose observation order is set when the process in S104 is closely set in S106 is set as a target observation area. Afterwards, control is returned to step S103, and the above-mentioned processes are repeated. On the other hand, if it is determined that there is no more observation area whose observation order has not been set in the determining process in S105 (the determination result is NO), then it is assumed that the observation order has been set on all observation areas, and the observation order process terminates.

The above-mentioned process is the observation order determining process.

Figure 6:
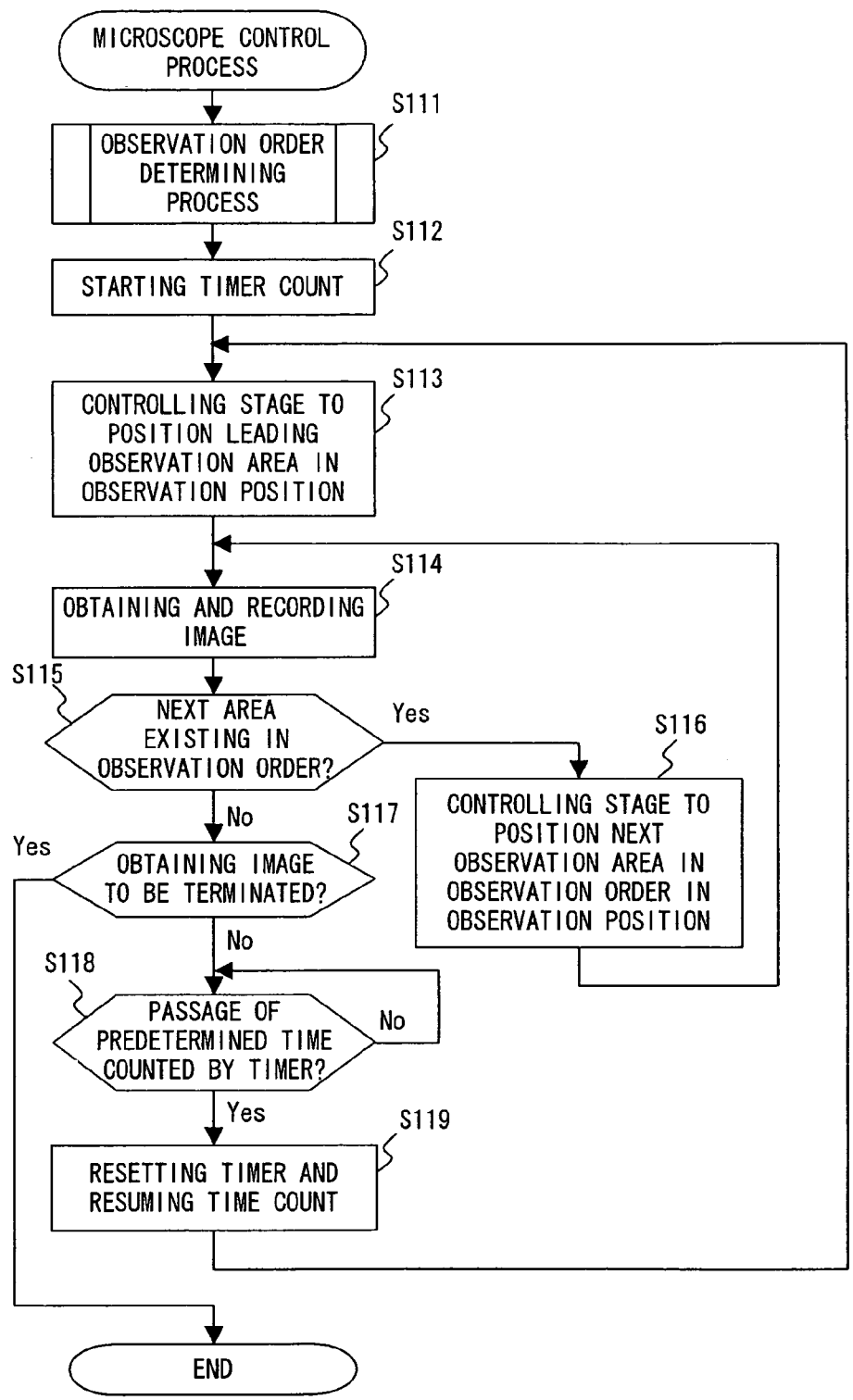
FIG. 6 is a flowchart showing the contents of the first example of the microscope control process.

The flowchart shown in FIG. 6 is explained below. FIG. 6 shows the contents of the first example of the microscope control process. This process is to control the entire system to perform an experiment for a multipoint time lapse observation, and is started when the above-mentioned control program 2d is started executed by the calculation processing unit 2a.

First, in S111, the observation order determining process is performed, and the observation order of all observation areas is determined.

In S112, the timer (not shown in the attached drawings) of the calculation processing unit 2a is activated, and the time counting is started.

In S113, the process (initial operation control process) of controlling an electric XY stage device on the stage 107, and moving the observation specimen 108 to locate the leading observation area (the first target observation area in the observation order) in the observation position is performed.

In S114, the body of the confocal point laser scanning microscope 1 is controlled to obtain (target observation area process) an image of a target observation area currently located in the observation position and store the image in the memory 2c, thereby passing control to S115 after the process.

In S115, in the observation order determined in the observation order determining process in S111, it is determined whether or not there is an area subsequent to the current target observation area. If there is (the determination result is YES), the electric XY stage device which is the stage 107 in S116 is controlled and the observation specimen 108 is moved to locate the target observation area in the next observation order in the observation position. Afterwards, control is returned to S114, and the above-mentioned processes are repeated. On the other hand, if there is no observation area subsequent to the current target observation area in the observation order (the determination result is NO in S115), control is passed to step 117.

In S117, it is determined whether or not obtaining an image is to be terminated. If it is terminated (determination result is YES), then the microscope control process is terminated. On the other hand, if an image is continuously obtained (the determination result is NO), control is passed to S118.

The determination in S117 is to determine whether or not a terminate instruction has been issued by an observer operating the operation panel 3. Instead, it is possible to automatically terminate the process by determining whether or not a predetermined number of images of observation areas have been obtained, whether or not a predetermined elapsed time has passed from the start of the experiment, etc.

In S118, it is determined using the above-mentioned timer whether or not a predetermined time has passed, and the process in S118 is repeated until a predetermined elapsed time is counted (until the determination result indicates YES).

In S119, counting time is resumed with the above-mentioned timer reset. Afterwards, control is returned to S113, and the above-mentioned process is performed from the leading observation area by assuming that the images are not obtained for the entire observation areas.

The above-mentioned process is the microscope control process, and the calculation processing unit 2a performs the process for the experiment of the multipoint time lapse observation in the system shown in FIG. 1.

Another embodiment of the present invention is explained below. The embodiment explained above is referred to as the "embodiment 1", and the embodiment explained below is referred to as the "embodiment 2".

In the embodiment 1, the observation specimen 108 is moved based on the observation order determined depending on the distance between the observation areas on the XY plane to obtain an image of a target image area. However, in the embodiment 1, the operation for obtaining a slice image (an image obtained by relatively moving the observation specimen 108 and the focusing position of the object lens 106 in the Z axis direction) in a target image area is not taken into account. On the other hand, in the embodiment 2, an experiment can be performed to observe a multipoint time lapse observation by shortening the amount of travel between the observation specimen 108 for observation (obtaining a slice image) in a target image area and the focusing position of the object lens 106.

The system configuration according to the embodiment 2 shown in FIG. 1 can be used as is. The selection procedure of a travel path of the observation area (observation specimen 108) in the embodiment 2 is explained below.

First, an observer observes an enlarged image of the observation specimen 108 through the eyepieces (not shown in the attached drawings) provided for the body of the confocal point laser scanning microscope 1. The observer operates the electric XY stage device and motorized focusing unit, and sets a plurality of observation areas on the observation specimen 108, thereby registering the position of the set observation area in the computer 2. However, in the setting and registering operations, the range of the Z axis direction in which an observation (obtaining a slice image) is made is set and registered for each observation area by specifying the z coordinate indicating the boundary of the range. The information about the position and range of each of the registered observation areas is stored in the memory 2c.

Then, the computer 2 determines the observation order of all observation areas by executing the method relating to the embodiment 1.

Figure 7A:
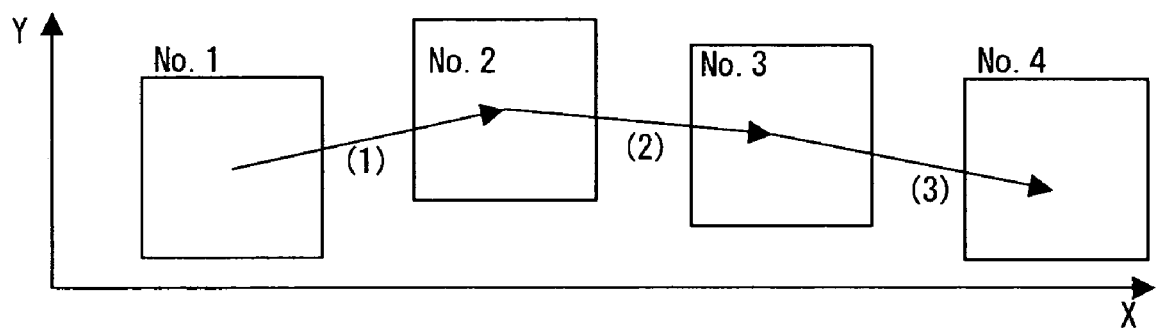
FIG. 7A is an explanatory view (1) showing the second example of the procedure of selecting the travel path of an observation area.

Assume that the observation order in the method of the embodiment 1 is determined for the four observation areas in the order of No. 1→No. 2→No. 3→No. 4 as shown in FIG. 7A. At this time, the range of acquisition of a slice image in the Z axis direction in each observation area is set in the boundary positions indicated by "Top" and "Bottom" for each observation area shown in FIG. 7B.

Then, the computer 2 controls the electric XY stage device, which is the stage 107, in the determined observation order, and moves the observation specimen 108 SO that the leading observation area can be located in the observation position. Then, the operation of the motorized focusing unit is controlled based on the settings of the range of acquisition of a slice image about the leading observation area, and the focal point of the object lens 106 is moved relatively from one boundary of the range to the other boundary, thereby performing observation (obtaining a slice image) at predetermined travel intervals.

The boundary of the range of acquisition of a slice image for starting the travel of the focal point in the leading observation area is selected in a predetermined manner, but an observer can also freely select it.

Figure 7B:
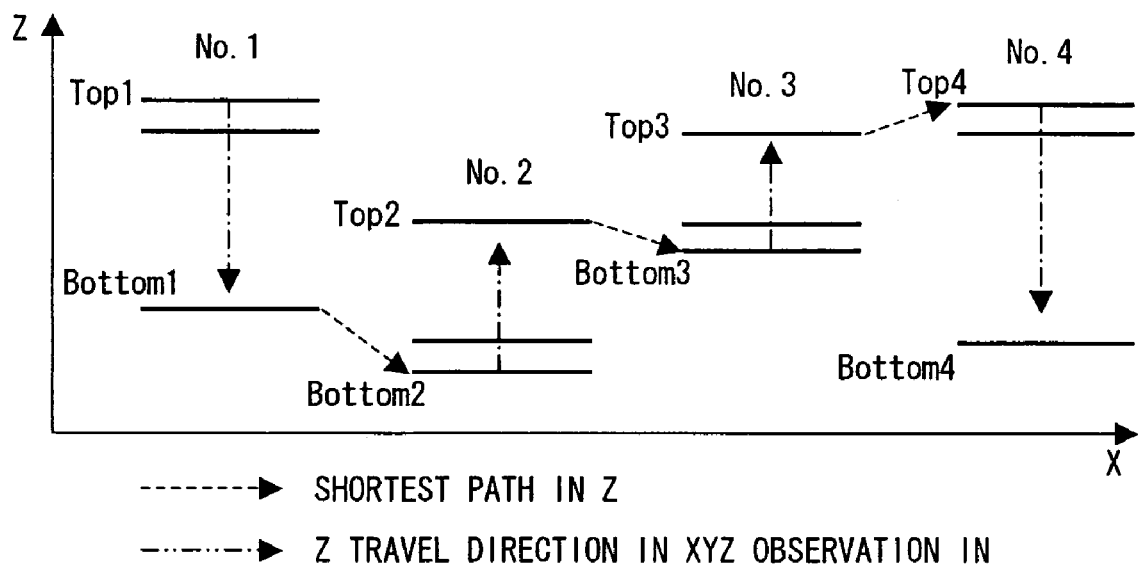
FIG. 7B is an explanatory view (2) showing the second example of the procedure of selecting the travel path of an observation area.

In the example shown in FIG. 7B, the computer 2 first controls the operation of the motorized focusing unit so that the focal point of the object lens 106 can move from the Z axis direction position of the 37 Top 1" to the Z axis direction of the "Bottom 1" in the observation area No. 1 which is the leading observation area. At this time, an observation is performed at predetermined travel intervals.

When an observation (obtaining a slice image) of a leading observation area is completed, the computer 2 controls the electric XY stage device which is the stage 107, and moves the observation specimen 108 so that the next observation area in the observation order can be located in the observation position. The motorized focusing unit is controlled based on the settings of the range of acquisition of a slice image of the observation area, and an observation is performed at predetermined travel intervals while relatively moving the focal point of the object lens 106 from one boundary (referred to as a "start-of-focus position") of the range to the other boundary (referred to as a "end-of-focus position") However, the boundary of the range of acquisition of a slice image for starting the travel of the focal point in the observation area is selected in such manner that the boundary closer to the end-of-focus position when the observation performed on the observation area immediately before in the observation order (in this case, the leading observation area) terminates can be selected.

The explanation is given by referring to FIG. 7B, assuming that the observation of the leading observation area No. 1 terminates when the focal point of the object lens 106 is located in the Z axis direction position of the "Bottom 1", the computer 2 controls the electric XY stage device which is the stage 107, and moves the observation specimen 108 such that the No. 2 observation area ranking second in the observation order can be located in the observation position. In this example, as it is clear as shown in FIG. 7B, the boundary "Bottom 2" in the settings of the range of acquisition of a slice image in the No. 2 observation area is closer to the end-of-focus position "Bottom 1" than the other boundary "Top 2". Therefore, the computer 2 controls the motorized focusing unit, and positions the focal point of the object lens 106 in the Z axis direction position of the "Bottom 2" which is the start-of-focus position, and then observations are performed at predetermined travel intervals while relatively moving the focal point of the object lens 106 in the Z axis direction position of the "Top 2" which is the end-of-focus position.

As described above, as in the above-mentioned method, the boundary closer to the end-of-focus position of the observation area immediately before in the observation order is selected, and the next observation area in the observation order is started.

The explanation is given by referring to FIG. 7B, the end-of-focus position in the No. 2 observation area is "Top 2". Since the area "Top 2" is closer to the boundary "Bottom 3" in the settings of the range of acquisition of a slice image in the next No. 3 observation area in the observation order than the boundary "Top 3", the computer 2 performs observation while moving the focal point of the object lens 106 from the start-of-focus position "Bottom 3" to the end-of-focus position "Top 3" in the No. 3 observation area. Similarly, in the No. 4 observation area subsequent to the No. 3 observation area, computer 2 performs observation while moving the focal point of the object lens 106 from the boundary "Top 4" close to the end-of-focus position "Top 3" in the observation area No. 3 to the boundary "Bottom 4".

As described above, the relative travel path for the observation specimen 108 of the focal point of the object lens 106 in the Z axis direction is shortened, and the wasteful operation of the motorized focusing unit is reduced. As a result, the required time of the experiment is further shortened, and the influence of the vibration generated when the motorized focusing unit on the 108 is operated is further reduced.

Figure 8:
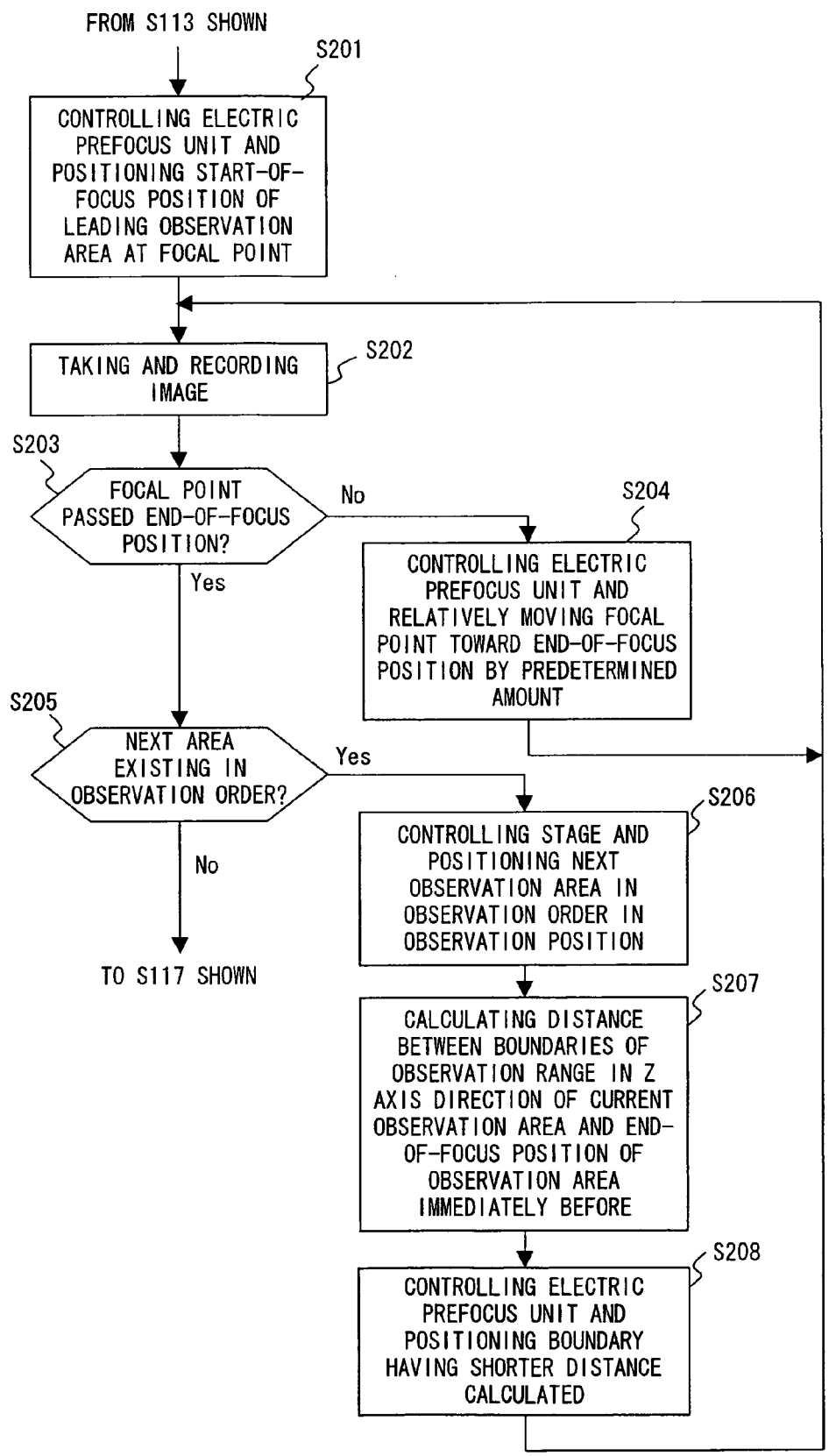
FIG. 8 shows a portion in the second example different from that in the first example in the microscope control process.

Described below is the process shown in FIG. 8. FIG. 8 is a flowchart showing the contents of the second example of the microscope control process, and shows the portions different from the first example shown in FIG. 6. The process of the second example is to perform the experiment for multipoint time lapse observation by controlling the entire system shown in FIG. 1, and is performed by the calculation processing unit 2a to realize the method of shortening the relative travel path for the observation specimen 108 of the focal point of the object lens 106 in the above-mentioned Z axis direction in the system shown in FIG. 1. The process is also started when the calculation processing unit 2a executes the control program 2d.

The contents of the process of the second example show the process in S114, S115, and S116 replaced with the processes in S201 through S208 shown in FIG. 8. In the second example, only the process step shown in FIG. 8 is explained.

In S201, performed after the process in S113 shown in FIG. 6, the motorized focusing unit is controlled and the start-of-focus position set in the leading observation area is positioned on the focal point of the object lens 106.

In S202, the body of the confocal point laser scanning microscope 1 is controlled, and an image of the target observation area currently positioned in the observation position is obtained (target observation area process) and stored in the memory 2c.

In S203, by the relative travel between the observation specimen 108 and the object lens 106 by the operation of the motorized focusing unit, it is determined whether or not the focal point of the object lens 106 has passed the end-of-focus position in the current target observation area. If it has passed (determination result is YES), then it is assumed that the current observation (obtain a slice image) in the current target observation area has been completed, and control is passed to step S205. On the other hand, if it has not passed (NO as a result of S203), then the motorized focusing unit is controlled in S204, and the focal point of the object lens 106 is moved by a predetermined amount in the direction of the end-of-focus position of the target observation area in S204. After that, control is returned to S202, and an image obtaining process is performed again. The predetermined amount is set based on the image scanning condition stored in the memory 2c.

In S205, in the observation order determined in the observation order determining process (FIG. 5) in S111 (FIG. 6), it is determined whether or not there is an area subsequent to the current target observation area. If there is (determination result is YES), control is passed to S206. If not (determination result is NO), control is passed to S117, and the process shown in FIG. 6 is performed.

In S206, the electric XY stage device which is the stage 107 is controlled, and the observation specimen 108 is moved to locate the next observation area in the observation order in the observation position as a target observation area.

In S207, the distance between each of the two boundaries designating the range of acquisition of a slice image set for the target observation area and the end-of-focus position of the observation area immediately before the acquisition from the memory 2c is calculated. In S208, the motorized focusing unit is controlled and the boundary having a shorter calculated distance is positioned at the focal point of the object lens 106. Afterwards, control is returned to S202, and the image obtaining process is performed again. The boundary positioned at the focal point of the object lens 106 is the start-of-focus position in the next observation area in the observation order, and the other boundary is the end-of-focus position of the observation area.

By the calculation processing unit 2a performing the second example of the microscope control process, the experiment for a multipoint time lapse observation having a short relative travel path for the observation specimen 108 of the focal point of the object lens 106 in the Z axis direction can be performed in the system shown in FIG. 1.

Explained below is the embodiment 3 which is a further embodiment of the present invention.

For example, in the time series observation of a live cell in a multipoint time lapse observation, when the shape of a cell is changed or a cell moves, there can be the necessity to add and set an observation area during the experiment.

Figure 9B:
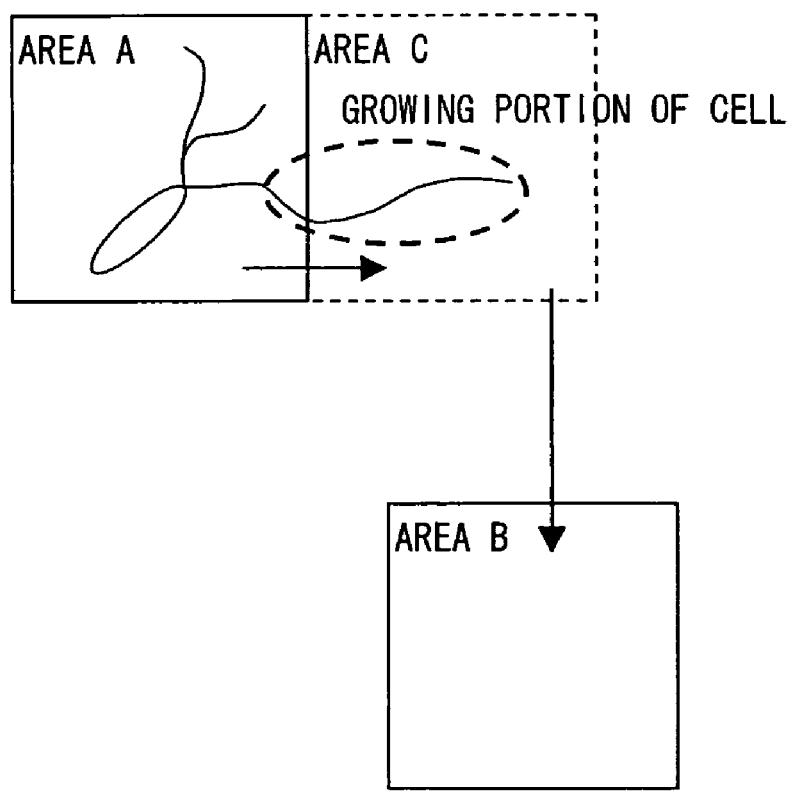
FIG. 9B is an explanatory view of adding an observation area.

For example, as shown in FIG. 9A, when the observation order of observation areas of "area A"→"area B" is determined in the observation order determining process (FIG. 5) as shown in FIG. 9A, assume that the entire image cannot be observed only in the area A because the cell contained in the area A grows after starting the experiment. At this time, as shown in FIG. 9B, the entire image cannot be observed unless the area C adjacent to the area A is added after starting the experiment.

In the embodiment 3, an observation area can be added and set after starting the experiment.

The system configuration according to the embodiment 3 can be the configuration shown in FIG. 1 as is.

Figure 10:
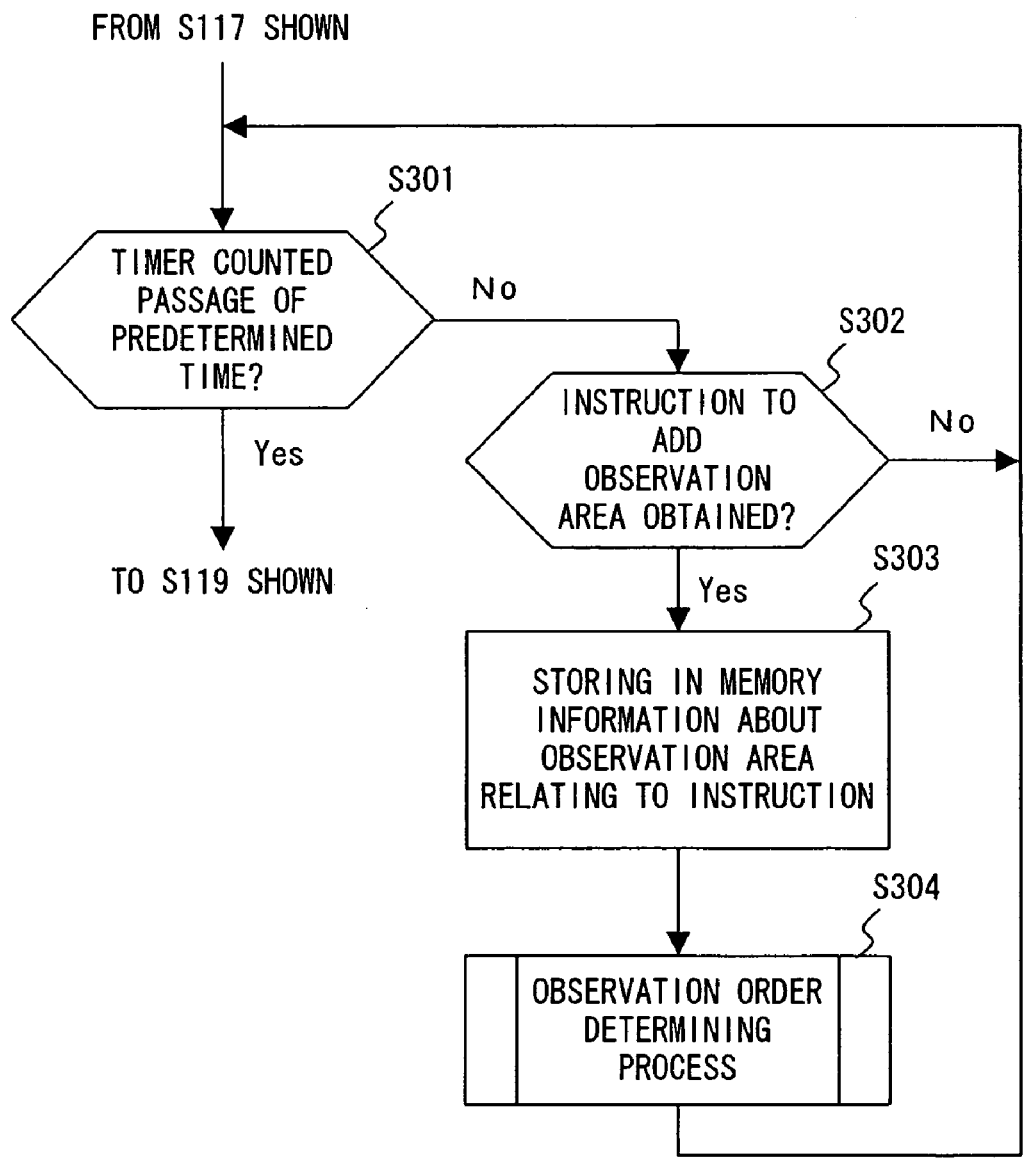
FIG. 10 shows a portion in the third example different from that in the first example in the microscope control process.

Described below is the process shown in FIG. 10. FIG. 10 is a flowchart showing the contents of the third example of the microscope control process, and shows the portions different from the first example shown in FIG. 6. The process of the third example is to perform the experiment for multipoint time lapse observation by controlling the entire system shown in FIG. 1, and is performed by the calculation processing unit 2a to add an observation area after starting the experiment by the system shown in FIG. 1. The process is also started when the calculation processing unit 2a executes the control program 2d.

The contents of the process of the third example show the process in S118 replaced with the processes in S301 through S304 shown in FIG. 10. In the third example, only the process step shown in FIG. 10 is explained.

In S301 performed when the determination result in S117 shown in FIG. 6 is NO, the process of determining whether or not the passage of a predetermined time predetermined by the timer has detected. If the predetermined time has passed (determination result is YES), then control is passed to S119 shown in FIG. 6. If the predetermined time has not passed (determination result is NO), control is passed to step S302.

In S302, the process of determining whether or not an add instruction for an observation area is performed. Addition of an observation area is performed by a user operating the operation panel 3 and inputting the information about the position, etc. of an observation area. Instead, for example, a sudden loss at a certain time in a portion of the contour of an image of the same specimen such as a cell displayed on the image of an observation area obtained at predetermined travel intervals can be detected, and based on the detected result, the information about the position, etc. of the observation area to be added based on the detection result can be generated and added by the calculation processing unit 2a.

In the determining process in S302, if the instruction is obtained (determination result is YES), then the additional information about the observation area relating to the instruction is stored in the memory 2c in S303. In the subsequent S304, the observation order determining process shown in FIG. 5 is performed. Afterwards, control is returned to S301, and the above-mentioned processes are repeated.

In the determining process in S302, if an instruction to add an observation area is not obtained (determination result is NO), control is immediately passed to S301, and the above-mentioned processes are repeated.

By the calculation processing unit 2a performing the third example of the microscope control process, the system shown in FIG. 1 can perform an experiment for a multipoint time lapse observation in which an observation area can be added after starting the experiment in the system shown in FIG. 1.

By further adding the change shown in FIG. 10 to the second example of the microscope control process obtained by adding the change shown in FIG. 8 to the flowchart shown in FIG. 6, an observation area can be added after starting the experiment for a multipoint time lapse observation in the embodiment 2.

By recording the control program 2d in a computer-readable record medium for allowing the CPU (not shown in the attached drawings) of the calculation processing unit 2a of the computer 2 to perform the process shown in the flowchart in FIGS. 5, 6, 8, and 10, and by allowing the computer 2 to read the program from a record medium to the computer 2 and the CPU to execute the program, the control for performing the experiment of the multipoint time lapse observation by the system shown in FIG. 1 can be performed by the computer 2.

Figure 11:
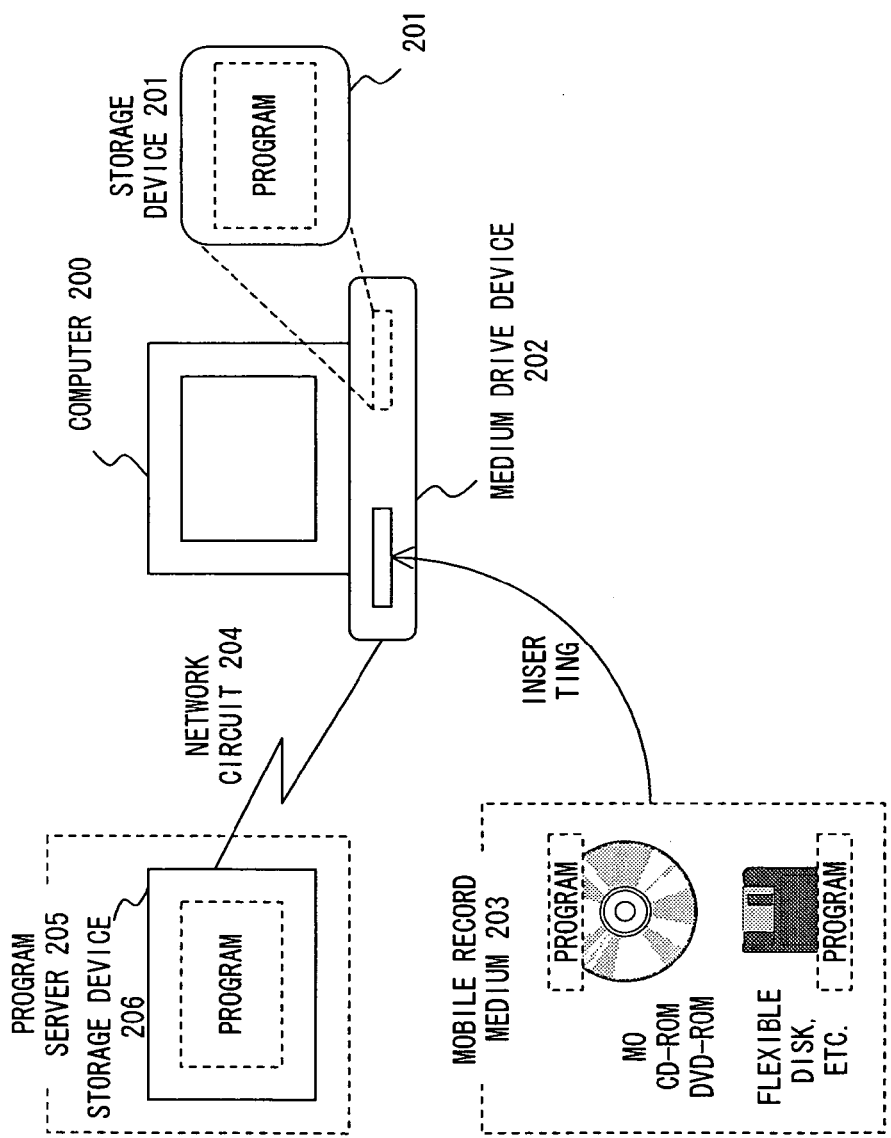
FIG. 11 shows an example of a record medium from which a recorded control program can be read.

A record medium on which a computer can read a recorded control program can be, for example, as shown in FIG. 11, a storage device 201 such as ROM and hard disk provided as a built-in device in a computer 200 or as an external accessory device, or a mobile record medium 403 which can be read by a medium drive device 202 provided in the computer such as a flexible disk, an MO (magneto-optical disk), CD-ROM, DVD-ROM, etc.

Furthermore, the record medium can be a storage device 206 of the computer functioning as a program server 205 connected to a computer through a network circuit 204. In this case, the transmission signal obtained by modulating a carrier wave by a data signal representing a control program is transmitted to the computer 200 through the network circuit 204 which is a transmission medium, and the computer 200 allows the CPU in the computer 200 to execute the control program by regenerating a control program.

Otherwise, the present invention is not limited to the above-mentioned embodiment, and can improve or change various types in a range not deviating the gist of the present invention.

For example, in each embodiment, an image of an observation area of a focal point of the object lens 106 is obtained for a multipoint time lapse observation (S114 shown in FIG. 6, and S202 shown in FIG. 8). The image obtaining process can be replaced with, or together with the image obtaining process, a strong laser beam can be emitted to the target observation area of the observation specimen 108 through the object lens 106 so that the process on a target observation area such as a stimulus applied to a cell, etc. contained in the target observation area sequentially positioned at the focal point of the object lens 106 can be performed.

What is claimed is:

1. A microscope apparatus, comprising:
    a plane traveling unit which moves an observation specimen on a plane perpendicular to an optical axis of an object lens;
    an observation area position setting-obtaining unit which obtains a setting of a position on the plane of each of a plurality of observation areas of the observation specimen;
    a target observation area process unit which obtains an image of or stimulates a target observation area, which is a given one of the observation areas in which a focusing position of the object lens is located;
    a calculation unit which calculates respective distances between the target observation area and other observation areas; and
    a plane travel control unit which controls the plane traveling unit to move the observation specimen so as to position one of the observation areas, on which no image obtaining process or stimulating process has been performed and which is a shortest distance from the target observation area among the observation areas, at the focusing position of the object lens.

2. The microscope apparatus according to claim 1, further comprising:
    a selection obtaining unit which obtains a selection of a leading observation area which is selected from among the observation areas as a first target observation area;
    an initial operation control unit which controls the plane traveling unit to move the observation specimen so as to position the leading observation area at the focusing position of the object lens; and
    a target observation area process control unit which allows the target observation area process unit to perform the image obtaining process or the stimulating process when any observation area is positioned at the focusing position of the object lens,
    wherein the plane travel control unit controls the plane traveling unit after the image obtaining process or the stimulating process is completed on one of the observation areas.

3. The microscope apparatus according to claim 2, further comprising:
    a time counter unit which counts passage of a predetermined time;
    wherein the initial operation control unit resumes control of the plane traveling unit each time the predetermined time passes; and
    wherein each time the predetermined time passes, the plane travel control unit assumes that the image obtaining process or the stimulating process has not been performed on any of the observation areas and controls the plane traveling unit in accordance with the assumption.

4. The microscope apparatus according to claim 1, further comprising:
    an optical axis direction travel unit which moves a relative position of the focusing position of the object lens and the observation specimen with respect to each other in an optical axis direction of the object lens;
    an observation area range obtaining unit which obtains a range along the optical axis direction of each of the observation areas; and
    an optical axis direction travel control unit which, when the target observation area is positioned at the focusing position, controls the optical axis direction travel unit to change the relative position of the focusing position and the observation specimen along a predetermined direction along the optical axis direction from one of the boundaries of the range obtained for the target observation area to another of the boundaries of the range;

wherein the target observation area process unit performs the image obtaining process or the stimulating process on the target observation area each time an amount of a change of the relative position of the focusing position and the observation specimen in the target observation area reaches a predetermined amount.

5. The microscope apparatus according to claim 4, wherein one of the boundaries the range for the target observation area at which the relative position of the focusing position and the observation specimen begins under control of the optical axis direction travel control unit is a start-of-focus position, and the other of the boundaries of the range, at which the relative position of the focusing position and the observation specimen ends under control of the optical axis direction travel control unit is an end-of-focus position, at which control by the optical axis direction travel control unit terminates;

wherein, when a next observation area is set at the focusing position of the object lens to be the target observation area, a start-of-focus position for the next observation area is set as one of the boundaries of the range along the optical axis direction set for the next observation area that is closer to the end-of-focus position of the observation area that immediately preceded said next observation area as the target observation area.

6. The microscope apparatus according to claim 3, further comprising:
an observation area position setting addition obtaining unit which obtains a setting of a position on the plane of a new observation area of the observation specimen after control of the initial operation control unit is started.

7. The microscope apparatus according to claim 1, wherein the stimulating process comprises emitting a laser beam to the target observation area through the object lens.

8. A microscope apparatus, comprising:
a plane traveling unit which moves an observation specimen on a plane perpendicular to an optical axis of an object lens;
an observation area position setting-obtaining unit which obtains a setting of a position on the plane of each of a plurality of observation areas of the observation specimen;
a target observation area process unit which obtains an image of or stimulates a target observation area, which is a given one of the observation areas in which a focusing position of the object lens is located;
a calculation unit which calculates respective distances between the target observation area and other observation areas; and
a plane travel control unit which controls the plane traveling unit to move the observation specimen to sequentially position all of the observation areas at the focusing position of the object lens such that the observation specimen is moved in an order based on the calculated distances which causes a travel path length to be a shortest possible length.

9. A method for controlling a microscope apparatus, comprising:
calculating respective distances between: (i) a target observation area which is a given observation area in which a focusing position of an object lens of the microscope apparatus is positioned, among a plurality of observation areas set for an observation specimen that is an observation target of the microscope apparatus, and (ii) other observation areas;
moving the observation specimen on a plane perpendicular to an optical axis of the object lens; and
positioning a next one of the observation areas, on which no image obtaining process or stimulating process has been performed and which is a shortest distance to the target observation area among the observation areas, at the focusing position of the object lens.

10. A computer-readable recording medium having a program stored thereon that is executable by a computer to cause the computer to control a microscope apparatus, so as to perform processes comprising:
calculating respective distances between: (i) a target observation area, which is a given observation area in which a focusing position of an object lens of the microscope apparatus is positioned, among a plurality of observation areas set for an observation specimen that is an observation target of the microscope apparatus, and (ii) other observation areas;
moving the observation specimen on a plane perpendicular to an optical axis of the object lens; and positioning a next one of the observation areas, on which no image obtaining process or stimulating process has been performed and which is a shortest distance to the target observation area among the observation areas, at the focusing position of the object lens.

11. A microscope apparatus, comprising:
plane traveling means for moving an observation specimen on a plane perpendicular to an optical axis of an object lens;
observation area position setting-obtaining means for obtaining a setting of a position on the plane of each of a plurality of observation areas of the observation specimen;
target observation area process means for obtaining an image of or stimulating a target observation area, which is a given one of the observation areas in which a focusing position of the object lens is located;
calculation means for calculating respective distances between the target observation area and other observation areas; and
plane travel control means for controlling the plane traveling means to move the observation specimen, so as to position one of the observation areas, on which no image obtaining process or stimulating process has been performed and which is a shortest distance to the target observation area among the observation areas, at the focusing position of the object lens.

12. A microscope apparatus, comprising:
plane traveling means for moving an observation specimen on a plane perpendicular to an optical axis of an object lens;
observation area position setting-obtaining means for obtaining a setting of a position on the plane of each of a plurality of observation areas of the observation specimen;
target observation area process means for obtaining an image of or stimulating a target observation area, which is a given one of the observation areas in which the focusing position of the object lens is located;
calculation means for calculating respective distances between the target observation area and other observation areas; and
plane travel control means for controlling the plane traveling means to move the observation specimen to sequentially position all of the observation areas at the focusing position of the object lens such that the observation specimen is moved in an order based on the calculated distances which causes a travel path length to be a shortest possible length.

13. A microscope apparatus which sequentially observes a plurality of areas of a sample, comprising:

a light source;

an optical system, including an object lens, which irradiates the sample with light from the light source;

an image generation unit which obtains an observed image by detecting light from the sample;

a motorized stage which moves the sample on a plane perpendicular to an optical axis of the object lens;

an observation area position information obtaining unit which obtains position information about N observation areas set for the sample;

an observation order setting unit which performs a process for setting an observation order I of each of the N observation areas, the process comprising:

obtaining position information about an observation area set as I=1; and evaluating a distance between an observation area having I=i−1, where i indicates a natural number from 2 through N, and an observation area whose order is not determined yet, setting an observation area corresponding to a shortest evaluated distance as an observation area having I=i, wherein the evaluating and setting processes are performed for i=2 to i=N; and an observation control unit which controls the motorized stage such that the N observation areas are sequentially positioned in an optical axis position of the object lens in the set observation order, such that the image generation unit obtains a sample image of each of the observation areas.

14. A method for controlling a microscope apparatus to sequentially observes a plurality of areas of a sample, wherein the microscope comprises: a light source, an optical system, including an object lens, which irradiates the sample with light from the light source, an image generation unit which obtains an observed image by detecting light from the sample, and a motorized stage which moves the sample on a plane perpendicular to an optical axis of the object lens, said method comprising:

obtaining position information about N observation areas set for the sample;

setting an observation order I of each of the N observation areas, by: (i) obtaining position information about an observation area set as I=1, (ii) evaluating a distance between an observation area having I=i−1, where i indicates a natural number from 2 through N, and an observation area whose order is not determined yet, and (iii) setting an observation area corresponding to a shortest evaluated distance as an observation area having I=i, wherein the evaluating and setting processes are performed for i=2 to i=N; and controlling the motorized stage such that the N observation areas are sequentially positioned in an optical axis position of the object lens in the set observation order, and obtaining a sample image of each of the observation areas via the image generation unit.

* * * * *